United States Patent
Byun

(10) Patent No.: US 11,720,276 B2
(45) Date of Patent: Aug. 8, 2023

(54) MEMORY SYSTEM AND CONTROLLER FOR MANAGING WRITE STATUS

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/336,554

(22) Filed: Jun. 2, 2021

(65) Prior Publication Data

US 2022/0179581 A1 Jun. 9, 2022

(30) Foreign Application Priority Data

Dec. 7, 2020 (KR) .......................... 10-2020-0169157

(51) Int. Cl.
*G06F 3/06* (2006.01)

(52) U.S. Cl.
CPC .......... *G06F 3/0653* (2013.01); *G06F 3/0625* (2013.01); *G06F 3/0655* (2013.01); *G06F 3/0679* (2013.01)

(58) Field of Classification Search
CPC .... G06F 3/0653; G06F 3/0625; G06F 3/0655; G06F 3/0679
See application file for complete search history.

(56) References Cited

U.S. PATENT DOCUMENTS

| | | | |
|---|---|---|---|
| 6,170,066 B1 * | 1/2001 | See .................... | G06F 12/0246 713/340 |
| 2010/0312947 A1 * | 12/2010 | Luukkainen .......... | G06F 3/0655 711/E12.008 |
| 2013/0311710 A1 * | 11/2013 | Yang .................... | G11C 16/22 711/103 |
| 2014/0337560 A1 * | 11/2014 | Chun .................. | G06F 12/0246 711/103 |
| 2018/0107417 A1 | 4/2018 | Shechter et al. | |
| 2019/0196743 A1 * | 6/2019 | Hsieh .................... | G06F 12/16 |

FOREIGN PATENT DOCUMENTS

CN 109284070 A * 1/2019 ............. G06F 12/16
KR 10-2019-0056862 A 5/2019

* cited by examiner

*Primary Examiner* — Michael Krofcheck
(74) *Attorney, Agent, or Firm* — IP & T Group LLP

(57) ABSTRACT

A memory system includes a storage medium and a controller. The storage medium includes a plurality of physical regions. The controller maps logical regions which are configured by a host device, to the physical regions, and performs in response to a write request for a target logical region, a write operation on a physical region mapped to the target logical region. The controller updates in response to the write request, a write status corresponding to the target logical region within a write status table.

20 Claims, 10 Drawing Sheets

MEMORY SYSTEM AND CONTROLLER FOR MANAGING WRITE STATUS

CROSS-REFERENCES TO RELATED APPLICATION

The present application claims priority under 35 U.S.C. § 119(a) to Korean application number 10-2020-0169157, filed on Dec. 7, 2020, which is incorporated herein by reference in its entirety as set forth in full.

BACKGROUND

1. Technical Field

Various embodiments of the present disclosure are related to a memory system, and more particularly, to a memory system including a nonvolatile memory device.

2. Related Art

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera, a mobile phone and so forth. The memory system may be mounted in the host device or may be fabricated to be capable of being connected to and detached from the host device.

SUMMARY

Embodiments of the present disclosure provide a memory system capable of effectively performing a recovery operation for an abnormal power-off and a controller thereof.

In an embodiment of the present disclosure, a memory system may include a storage medium and a controller. The storage medium may include a plurality of physical regions. The controller may be configured to map logical regions which are configured by a host device, to the physical regions, and configured to perform in response to a write request for a target logical region, a write operation on a physical region mapped to the target logical region. The controller may be configured to update in response to the write request, a write status corresponding to the target logical region within a write status table.

In an embodiment of the present disclosure, a memory system may include a storage medium and a controller. The storage medium may include a plurality of physical regions. The controller may be configured to change a write status corresponding to a target physical region among the physical regions from a first status to a second status when the write status is the first status within a write status table in response to a write request for the target physical region and configured to keep the write status as the second status when the write status is the second status in response to the write request for the target physical region.

In an embodiment of the present disclosure, a controller of a memory system may include a write unit and a recovery unit. The write unit may be configured to map logical regions which are configured by a host device, to physical regions, and configured to perform in response to a write request for a target logical region, a write operation on a physical region mapped to the target logical region. The recovery unit may be configured to skip a recovery operation on a physical region mapped to a logical region having a write status which is a first status and configured to perform the recovery operation on a physical region mapped to a logical region having a write status which is a second status, when it is determined during a booting operation that there is an abnormal power-off.

In an embodiment of the present disclosure, an operating method of a data processing system including a host and a memory system may include performing, by a memory system, a write operation on a physical region included therein in response to a request is from the host; controlling, by the memory system, the host to record therein information of a logical region mapped to the physical region; recovering, by the memory system, the physical region based on the recorded information when powered on after a sudden power off thereof; and controlling, by the memory system, the host to delete the record after the recovery.

According to an embodiment of the present disclosure, provided may be a memory system capable of effectively performing a recovery operation and a controller thereof.

DETAILED DESCRIPTION

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The drawings are not necessarily to scale and, in some instances, proportions may have been exaggerated to clearly illustrate features of the embodiments. The terminology used herein is for the purpose of describing particular embodiments only and is not intended to be limiting of the invention.

As used herein, the term "and/or" includes at least one of the associated listed items. It will be understood that when an element is referred to as being "on", "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, various embodiments of the present disclosure will be described below with reference to the accompanying drawings.

Figure 1:
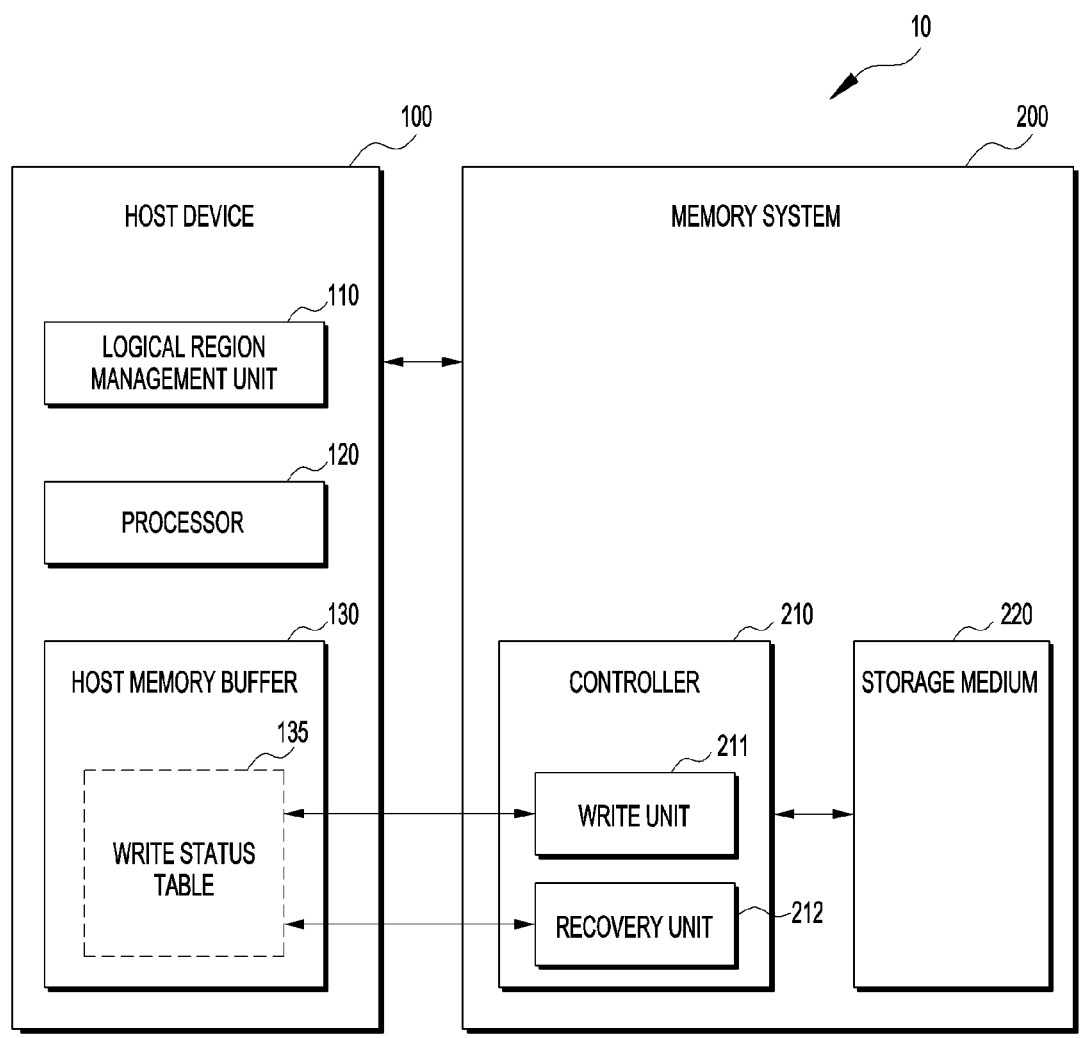
FIG. 1 is a block diagram illustrating a data processing system according to an embodiment of the present disclosure.

FIG. 1 is a block diagram illustrating a data processing system 10 according to an embodiment of the present disclosure.

Referring to FIG. 1, the data processing system 10 may be an electronic system capable of processing data. The data processing system 10 may include a data center, an internet data center, a cloud data center, a personal computer, a laptop computer, a smartphone, a tablet computer, a digital camera, a game console, a navigation device, a virtual reality device, a wearable device and so forth.

The data processing system 10 may include a host device 100 and a memory system 200.

While processing data, the host device 100 may access the memory system 200 by utilizing logical addresses. The host device 100 may access the memory system 200 by assigning a logical address to data.

The host device 100 may include a logical region management unit 110, a processor 120 and a host memory buffer 130.

The logical region management unit 110 may configure a plurality of logical regions based on logical addresses. Each logical region may correspond to consecutive logical addresses. In response to a request from the processor 120, the logical region management unit 110 may assign to the processor 120 an available logical region, i.e., a logical region corresponding to which logical addresses are not yet assigned to data.

In order to store data into the memory system 200, the processor 120 may request the assignment of a logical region from the logical region management unit 110. After a logical region is assigned thereto, the processor 120 may store data into the memory system 200 by utilizing the logical addresses within the assigned logical region. Specifically, the processor 120 may assign to data, the logical addresses within the assigned logical region and may provide the memory system 200 with a write request including the data and the assigned logical addresses, to store the data into the memory system 200. Hereinafter, when the processor 120 provides the memory system 200 with a write request including a logical address and data, a logical region including the logical address may be referred to as a target logical region corresponding to the write request.

The processor 120 may sequentially utilize the consecutive logical addresses configuring the logical region in an ascending order. Therefore, a write request from the processor 120 may be a sequential write request related to the consecutive logical addresses of the logical region.

A single logical region may be assigned to the processor 120 at a time. According to an embodiment, two or more logical regions may be assigned to the processor 120 at a time. Although not illustrated, the host device 100 may include a plurality of processors, each of which may be assigned with a single logical region. In this case, write requests from one or more processors may correspond to different logical regions and each of the write requests may be a sequential write request.

The processor 120 may include a central processing unit, a graphic processing unit, a micro-processor, an application processor, an accelerated processing unit, an operating system and so forth.

The host memory buffer 130 may store therein a write status table 135. The write status table 135 may be managed and referred to by a write unit 211 and a recovery unit 212 within the memory system 200, which will be described later in more detail. The write status table 135 may include write statuses corresponding to one or more logical regions.

The host memory buffer 130 may operate according to a standard such as the NonVolatile Memory express (NVMe) for example.

The memory system 200 may be configured to store therein data which is provided from the host device 100, in response to a write request from the host device 100. The memory system 200 may be configured to provide a host device with data, which is stored therein, in response to a read request from the host device 100.

The memory system 200 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 200 may include a controller 210 and a storage medium 220.

The controller 210 may control an overall operation of the memory system 200. The controller 210 may control the storage medium 220 to perform a foreground operation in response to an instruction from the host device 100. The foreground operation may include operations of writing data into the storage medium 220 and reading data from the storage medium 220 in response to instructions from the host device 100, that is, a write request and a read request.

Furthermore, the controller 210 may control the storage medium 220 to perform an internally necessary background operation independently of the host device 100. The background operation may include at least one of a wear-leveling operation, a garbage collection operation, an erase operation, a read reclaim operation and a refresh operation for the storage medium 220. Like the foreground operation, the background operation may include operations of writing data into the storage medium 220 and reading data from the storage medium 220.

The controller 210 may include the write unit 211 and the recovery unit 212.

The write unit 211 may map a logical region, which is assigned to the processor 120, to one or more physical regions within the storage medium 220. The write unit 211 may manage mapping information between logical and physical regions. In response to a write request from the processor 120, the write unit 211 may store data into a physical region mapped to a target logical region corresponding to the write request. According to an embodiment, for each logical region, the write unit 211 may map the logical region to one or more physical regions when receiving a write request initially for the logical region.

The write unit 211 may manage the write status table 135 within the host memory buffer 130. In response to a write request for a target logical region, the write unit 211 may update a write status corresponding to the target logical region within the write status table 135 stored in the host memory buffer 130. Specifically, when a write status corresponding to a target logical region is a first status (e.g., a disabled status), the write unit 211 may change the disabled status to a second status (e.g., an enabled status). When the write status corresponding to the target logical region is the enabled status, the write unit 211 may keep the enabled status.

According to an embodiment, the write unit 211 may update a write status corresponding to a target logical region after receiving a write request for the target logical region, before performing a write operation, during the write operation, or after completion of the write operation.

According to an embodiment, the write unit 211 may manage a write status corresponding to only a logical region mapped to an open physical region among physical regions within the storage medium 220. An open physical region may be a physical region, on which a write operation is performed in response to a write request. According to an embodiment, when the open physical region is full of data stored therein, the write unit 211 may remove from the write status table 135 a write status corresponding to a logical region mapped to the open physical region or may change the write status to the disabled status.

According to an embodiment, the write unit 211 may manage write statuses corresponding to only one or more logical regions that have been target logical regions of write requests. According to an embodiment, the write unit 211 may manage write statuses corresponding to only occupied logical regions, i.e., logical regions comprising logical addresses that are assigned for data. According to an embodiment, the write unit 211 may manage write statuses corresponding to all logical regions configured by the logical region management unit 110. The logical region management unit 110 may provide the write unit 211 with information of the logical regions.

According to an embodiment, when the write status table 135 does not include a write status corresponding to a logical region and then a write request is provided to the memory system 200 for the logical region, the write unit 211 may include the write status corresponding to the logical region, as the enabled status, into the write status table 135.

According to an embodiment, when providing a write request, the host device 100 may provide a logical region identifier ID as well as a logical address and data. A logical region identifier ID may indicate a logical region corresponding to the provided logical address. Therefore, the write unit 211 may identify a target logical region corresponding to the write request through the logical region identifier ID included in the write request. According to an embodiment, even when a write request does not include a logical region identifier ID, the write unit 211 may determine a target logical region based on a logical address included in the write request and may recognize the logical region identifier ID indicating the target logical region.

During a booting operation of the controller 210, the recovery unit 212 may perform a recovery operation when the memory system 200 is determined as powered off abnormally before the booting operation. At this time, the recovery unit 212 may refer to the write status table 135 stored in the host memory buffer 130 to perform a recovery operation only on selected physical regions within the storage medium 220.

Specifically, the recovery unit 212 may refer to the write status table 135 to perform a recovery operation on a physical region mapped to a logical region, corresponding to which a write status is the enabled status. The recovery unit 212 may refer to the write status table 135 not to perform or to skip/omit a recovery operation on a physical region mapped to a logical region, corresponding to which a write status is the disabled status.

After completing a recovery operation on a physical region, the recovery unit 212 may change, to the disabled status, a write status corresponding to a logical region mapped to the physical region. Therefore, even when the memory system 200 is repetitively powered off abnormally, the recovery unit 212 may identify as the disabled status, a write status corresponding to a logical region mapped to a physical region, on which a recovery operation is previously performed, through the write status table 135. Accordingly, an unnecessary recovery operation may not be performed on a physical region, on which a recovery operation is previously performed.

To sum up, according to an embodiment, an unnecessary recovery operation may be prevented on an open physical region, on which it is not required to perform a recovery operation, by managing the write status table 135. That is, an amount of time required to recover physical regions may be reduced since a recovery operation is performed only on an open physical region selected from whole open physical regions with reference to the write status table 135. Furthermore, an amount of time required to analyse physical regions for a recovery operation may be effectively reduced since the controller 210 may easily identify an open physical region, on which a recovery operation is required to be performed among whole open physical regions, by referring to the write status table 135.

Furthermore, the write status table 135 may be secured safely in the host memory buffer 130 as long as the host device 100 keeps being powered on even when the memory system 200 is powered off abnormally. Therefore, a recovery operation may be properly performed on the basis of the write status table 135.

Furthermore, the write status table 135 may be managed in the host memory buffer 130 having a great operational speed. Therefore, even frequent update of the write status table 135 may not affect the operational performance of the memory system 200.

Furthermore, the controller 210 may manage the write status table 135 in units of logical regions. Therefore, write statuses corresponding to logical regions may be easily managed even when physical regions are mapped to the logical regions in any unit or in any method.

According to an embodiment, for a case that the host device 100 is also powered off abnormally as well as the memory system 200, the write unit 211 may periodically store into the host memory buffer 130, information (e.g., parity data) of validity verification for the write status table 135 while managing the write status table 135. According to an embodiment, whenever updating the write status table 135, the write unit 211 may generate the information of validity verification for the updated write status table 135 and may store into the host memory buffer 130, the information of validity verification for the updated write status table 135. When the memory system 200 is determined, during a booting operation, as powered off abnormally before the booting operation, the recovery unit 212 may first determine the validity of the write status table 135 based on the information of validity verification for the write status table 135. When the write status table 135 is determined as valid, the recovery unit 212 may refer to the write status table 135 to perform the above-described recovery operation on selected physical regions. When the write status table 135 is determined as invalid, the recovery unit 212 may perform a recovery operation while ignoring the write status table 135. According to an embodiment, when the write status table 135 is determined as invalid, the recovery unit 212 may perform a recovery operation on all of one or more open physical regions.

According to an embodiment, the write unit 211 may further manage, within the write status table 135, a write status corresponding to a system region in the storage medium 220 as well as a write status corresponding to a logical region. The system region in the storage medium 220 may be a physical region configured to store therein not data provided from the host device 100 but data required for an operation of the memory system 200 and data generated during the operation. Therefore, the system region may not be mapped to any logical region. Accordingly, in order to effectively manage the necessity of a recovery operation on the system region, the write unit 211 may manage the write status corresponding to the system region within the write status table 135. A scheme of managing the write status corresponding to the system region as the enabled status or the disabled status may be the same as the scheme of managing a write status corresponding to a logical region. In the same way as described above, the recovery unit 212 may selectively perform a recovery operation on the system region by referring to the write status corresponding to the system region.

The storage medium 220 may store therein data provided from the controller 210 and may provide the controller 210 with data stored therein, under the control of the controller 210.

The controller 210 may configure the plurality of physical regions within the storage medium 220. The erase operation may be performed in units of physical regions within the storage medium 220. In other words, whole data stored in a physical region may be erased at a time through the erase operation. For example, a physical region may be a memory block included in a single nonvolatile memory apparatus. For example, a physical region may be a group of memory blocks that are included in a plurality of nonvolatile memory apparatuses, respectively, and can be accessed in parallel. For example, a physical region may be a superblock.

A physical region may include a plurality of memory units corresponding to consecutive physical addresses, respectively. A write operation or a read operation may be performed in units of memory units within the storage medium 220. The write unit 211 may store data into the memory units according to the sequence of the physical addresses.

Once data is stored in a memory unit within a physical region, the write unit 211 may further manage mapping information between a logical address corresponding to the data and a physical address corresponding to the memory unit.

The storage medium 220 may include one or more nonvolatile memory apparatuses. The nonvolatile memory apparatus may include a flash memory device (e.g., the NAND Flash or the NOR Flash), the Ferroelectrics Random Access Memory (FeRAM), the Phase-Change Random Access Memory (PCRAM), the Magnetic Random Access Memory (MRAM), the Resistive Random Access Memory (ReRAM) and so forth.

Figure 2:
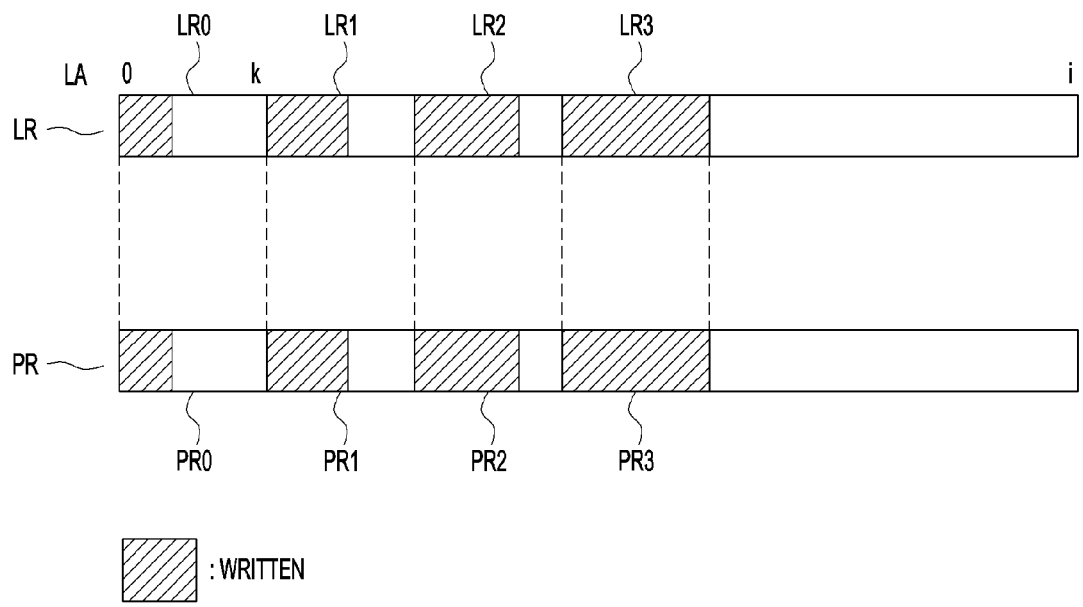
FIG. 2 is a diagram illustrating logical regions and physical regions according to an embodiment of the present disclosure.

FIG. 2 is a diagram illustrating logical regions LR and physical regions PR according to an embodiment of the present disclosure.

Referring to FIG. 2, the host device 100 may configure one or more logical regions LR by dividing logical addresses LA from '0' to 'i'. Each of the logical regions LR may comprise consecutive logical addresses.

Each of the logical regions LR may be mapped to one or more physical regions PR within the storage medium 220. For example, as illustrated, the logical regions LR0, LR1, LR2 and LR3 may be mapped to the physical regions PR0, PR1, PR2 and PR3, respectively. Although FIG. 2 illustrates an example that a single logical region LR is mapped to a single physical region PR, a single logical region LR may be mapped to two or more physical regions PR. Although FIG. 2 illustrates an example that the logical regions LR and the physical regions PR are sequentially mapped according to a sequence of addresses, the logical regions LR and the physical regions PR may be mapped regardless of the sequence of addresses.

According to an embodiment, the write unit 211 may manage the mapping information between the logical regions LR and the physical regions PR. For example, the mapping information may include the logical region identifier of a logical region LR and a physical address corresponding to a physical region PR that is mapped to the logical region LR. Therefore, the write unit 211 may identify the mapping relationship between the logical region LR and the physical region PR through the mapping information to process a write request and a read request provided from the host device 100. According to an embodiment, the write unit 211 may not manage or utilize separate mapping information and may identify mapping relationships between the logical regions LR and the physical regions PR according to a predetermined rule.

The logical regions LR and the physical regions PR may be mapped in the same size. That is, a size of a single logical region LR may be the same as a size of one or more physical regions PR mapped to the single logical region LR. In other words, a size of data corresponding to logical addresses configuring a single logical region LR may be the same as a size of data that can be stored in one or more physical regions PR mapped to the single logical region LR.

As described above, the write unit 211 may process a write request for a target logical region LR with a physical region PR mapped to the target logical region LR. For example, when a write request corresponds to one or more logical addresses between '0' and 'k', a target logical region LR may be a logical region LR0. In response to the write request, the write unit 211 may store data into a physical region PR0 mapped to the target logical region LR0.

Referring to FIG. 2, a physical region PR3 may be full of data stored therein. Each of physical regions PR0, PR1 and PR2 may be an "open" physical region, into which data is being stored. In a similar manner, all logical addresses configuring a logical region LR3 mapped to the physical region PR3 may be assigned to data. Logical addresses configuring each of logical regions LR0, LR1 and LR2 respectively mapped to the physical regions PR0, PR1 and PR2 may be assigned to data. Hereinafter, description will be made with reference to FIGS. 3 and 4 for the mapping situation as described with reference to FIG. 2.

Figure 3:
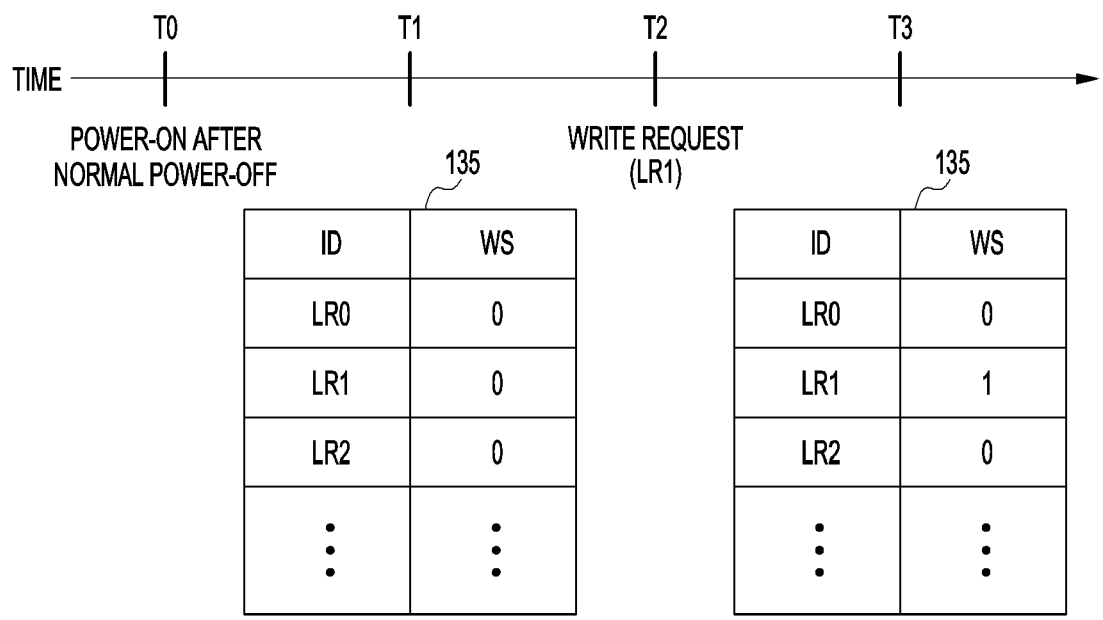
FIG. 3 is a diagram illustrating an operation of updating a write status within a write status table stored in a host memory buffer according to an embodiment of the present disclosure.

FIG. 3 is a diagram illustrating an operation of updating a write status WS within the write status table 135 stored in the host memory buffer 130 according to an embodiment of the present disclosure. FIG. 3 illustrates a case that the memory system 200 is powered off normally and then powered on.

Referring to FIG. 3, the memory system 200 may be powered on at a time point T0. The recovery unit 212 may determine, during a booting operation, that there is not an abnormal power-off of the memory system 200 such as a sudden power-off right before the booting operation.

At a time point T1, the host memory buffer 130 may keep the write status table 135 stored by the write unit 211 if the host device 100 is not powered off right before the booting operation. The write status table 135 may include one or more logical region identifiers ID and write statuses WS corresponding to the respective logical region identifiers ID. The write status WS corresponding to one of the logical region identifiers ID may be a write status corresponding to a logical region LR indicated by the corresponding logical region identifier ID. In FIG. 3, a value "0" of the write status WS may indicate the disabled status and a value "1" of the write status WS may indicate the enabled status. According to an embodiment, any value of the write status WS may be utilized to indicate the enabled status or the disabled status.

At the time point T1, the recovery unit 212 may change all the write statuses WS to the disabled status within the write status table 135. The disabled status may be an initial status. The disabled status corresponding to a logical region LR may represent that any write request has never been processed for the logical region LR after the power-on. In other words, the disabled status corresponding to the logical region LR may represent that any write operation has never been performed on a physical region PR mapped to the logical region LR after the power-on.

At a time point T2, the write unit 211 may receive a write request for a target logical region LR1. In response to the write request, the write unit 211 may store data into a physical region PR1 mapped to the target logical region LR1.

At a time point T3, the write unit 211 may change the write status WS of the target logical region LR1 from the disabled status to the enabled status within the write status table 135. When additionally receiving a write request for the target logical region LR1 while the write status WS of the target logical region LR1 stays as the enabled status, the write unit 211 may keep the write status WS of the target logical region LR1 as the enabled status. The enabled status corresponding to a logical region LR may represent that a write request has been processed for the logical region LR after the power-on. In other words, the enabled status corresponding to the logical region LR may represent that a write operation has been performed on a physical region PR mapped to the logical region LR after the power-on.

According to an embodiment, the write status table 135 may include a physical address instead of the logical region identifier ID. A write status WS corresponding to the physical address may be a write status corresponding to a physical region PR indicated by the physical address. Meanings of the disabled status and the enabled status as the write status WS of a physical region PR may be the same as those of a logical region LR. That is, the disabled status corresponding to the physical region PR indicated by the physical address may represent that any write operation has never been performed on the physical region PR after the power-on and the enabled status corresponding to the physical region PR indicated by the physical address may represent that a write operation has been performed on the physical region PR after the power-on.

Figure 4:
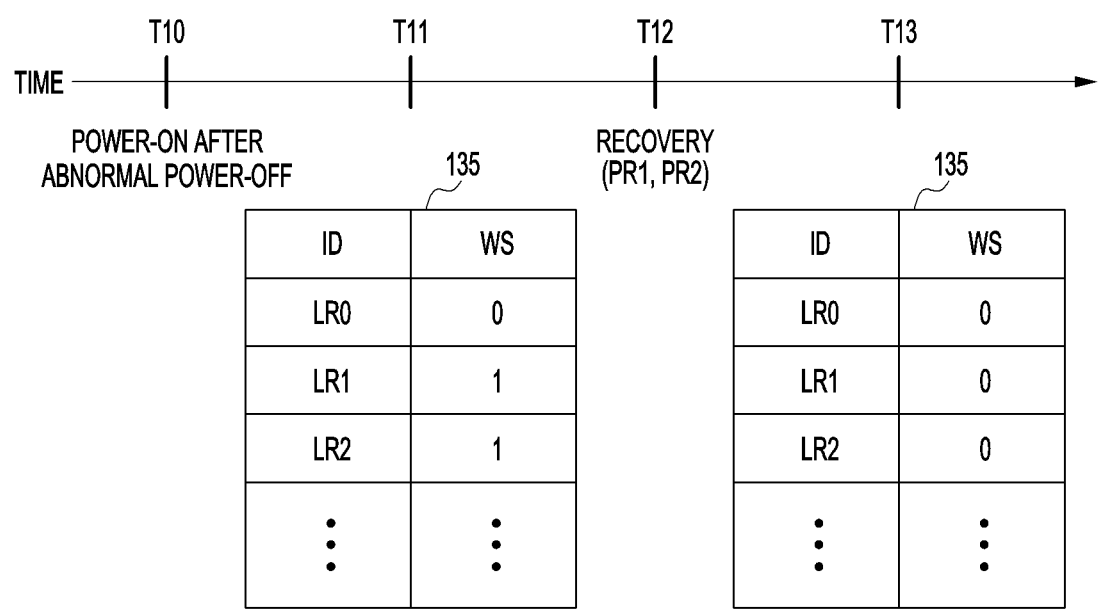
FIG. 4 is a diagram illustrating an operation of performing a recovery operation by referring to a write status within a write status table stored in a host memory buffer according to an embodiment of the present disclosure.

FIG. 4 is a diagram illustrating an operation of performing a recovery operation by referring to a write status WS within the write status table 135 stored in the host memory buffer 130 according to an embodiment of the present disclosure. FIG. 4 illustrates that the memory system 200 is powered off abnormally and then powered on.

Referring to FIG. 4, the memory system 200 may be powered on at a time point T10. The recovery unit 212 may determine, during a booting operation, that there is an abnormal power-off of the memory system 200 such as a sudden power-off right before the booting operation.

At a time point T11, the host memory buffer 130 may keep the write status table 135 stored by the write unit 211 if the host device 100 is not powered off right before the booting operation. The recovery unit 212 may check the write status table 135 stored in the host memory buffer 130. Within the write status table 135, the recovery unit 212 may identify the write statuses WS of the logical regions LR1 and LR2 as the enabled status and may identify the write status WS of the logical region LR0 as the disabled status. In a case that there is a sudden power-off of the memory system 200 right before the booting operation, the enabled status may represent that a recovery operation is required to be performed on the physical regions PR1 and PR2 mapped to the logical regions LR1 and LR2. The disabled status may represent that a recovery operation is not required to be performed on the physical region PR0 mapped to the logical region LR0 even when there is a sudden power-off of the memory system 200 right before the booting operation.

At a time point T12, the recovery unit 212 may perform a recovery operation on the physical regions PR1 and PR2 mapped to the logical regions LR1 and LR2. The recovery operation may include at least one of a dummy write operation on an unstable memory unit, a copy operation for unstable data, a recovery operation for map data and a recovery operation for various meta data, in each of the physical regions PR1 and PR2. The recovery unit 212 may not perform a recovery operation on the physical region PR0 mapped to the logical region LR0.

At a time point T13, the recovery unit 212 may change each of the write statuses WS of the logical regions LR1 and LR2 from the enabled status to the disabled status within the write status table 135 stored in the host memory buffer 130. That is, the disabled status may represent completion of the recovery operation on the physical regions PR1 and PR2 mapped to the logical regions LR1 and LR2 even when there is a sudden power-off of the memory system 200 right before the booting operation.

The booting operation may be performed when the host device 100 requests a hardware reset of the memory system 200 as well as when the memory system 200 is powered on. Therefore, although the time points T0 and T10 of FIGS. 3 and 4 represent when the memory system 200 is powered on, the recovery unit 212 may perform the same operation as described with reference to FIGS. 3 and 4 when the host device 100 requests the hardware reset of the memory system 200.

Figure 5:
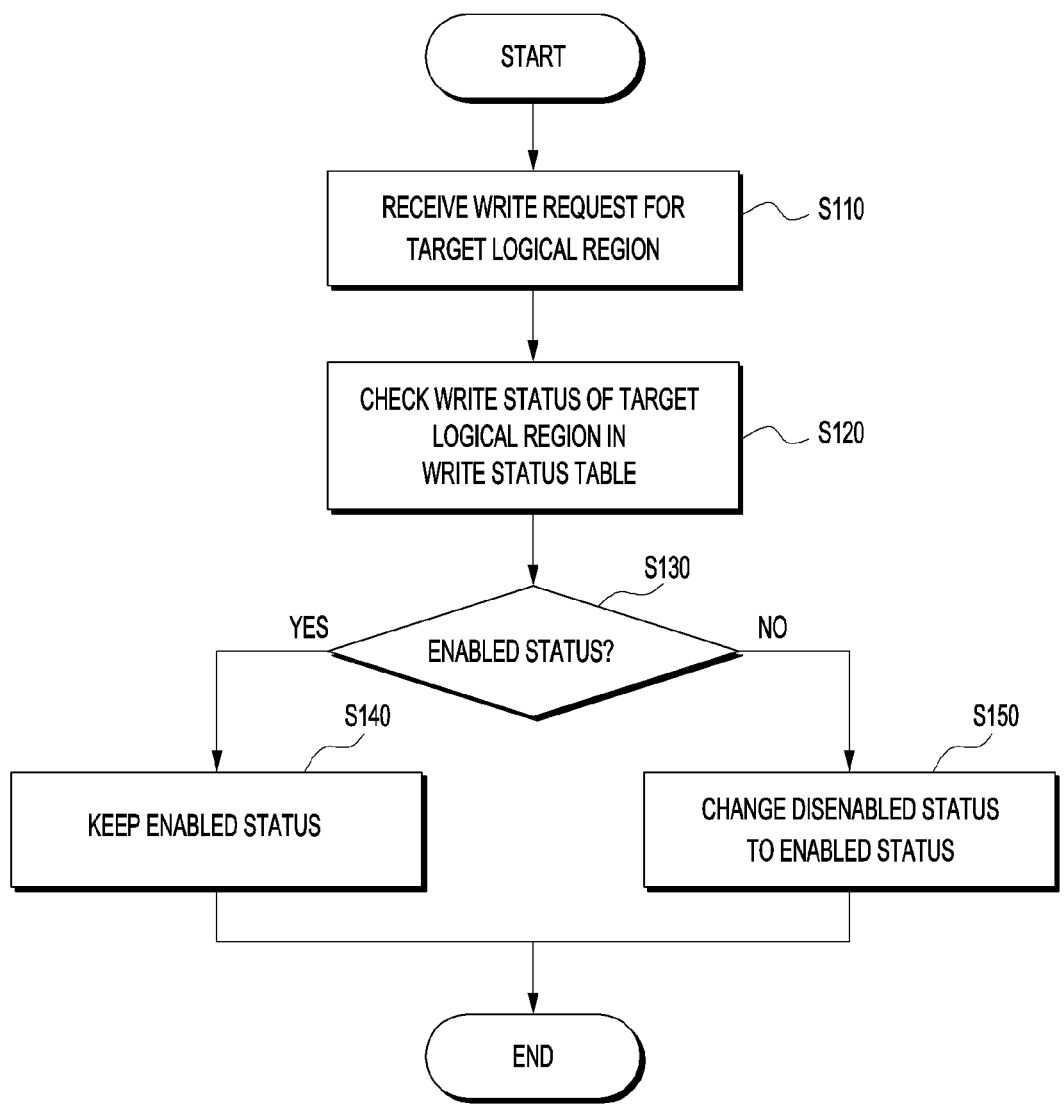
FIG. 5 is a flowchart illustrating an operation of a write unit of FIG. 1 according to an embodiment of the present disclosure.

FIG. 5 is a flowchart illustrating an operation of the write unit 211 of FIG. 1 according to an embodiment of the present disclosure.

Referring to FIG. 5, in operation S110, the write unit 211 may receive a write request for a target logical region.

In operation S120, the write unit 211 may check the write status corresponding to the target logical region within the write status table 135 stored in the host memory buffer 130.

In operation S130, the write unit 211 may determine whether the write status corresponding to the target logical region is the enabled status. When the write status corresponding to the target logical region is determined to be the enabled status, the process may proceed to operation S140. When the write status corresponding to the target logical region is determined to be the disabled status, the process may proceed to operation S150.

In operation S140, the write unit 211 may keep the enabled status as the write status corresponding to the target logical region.

In operation S150, the write unit 211 may change the write status corresponding to the target logical region from the disabled status to the enabled status.

Figure 6:
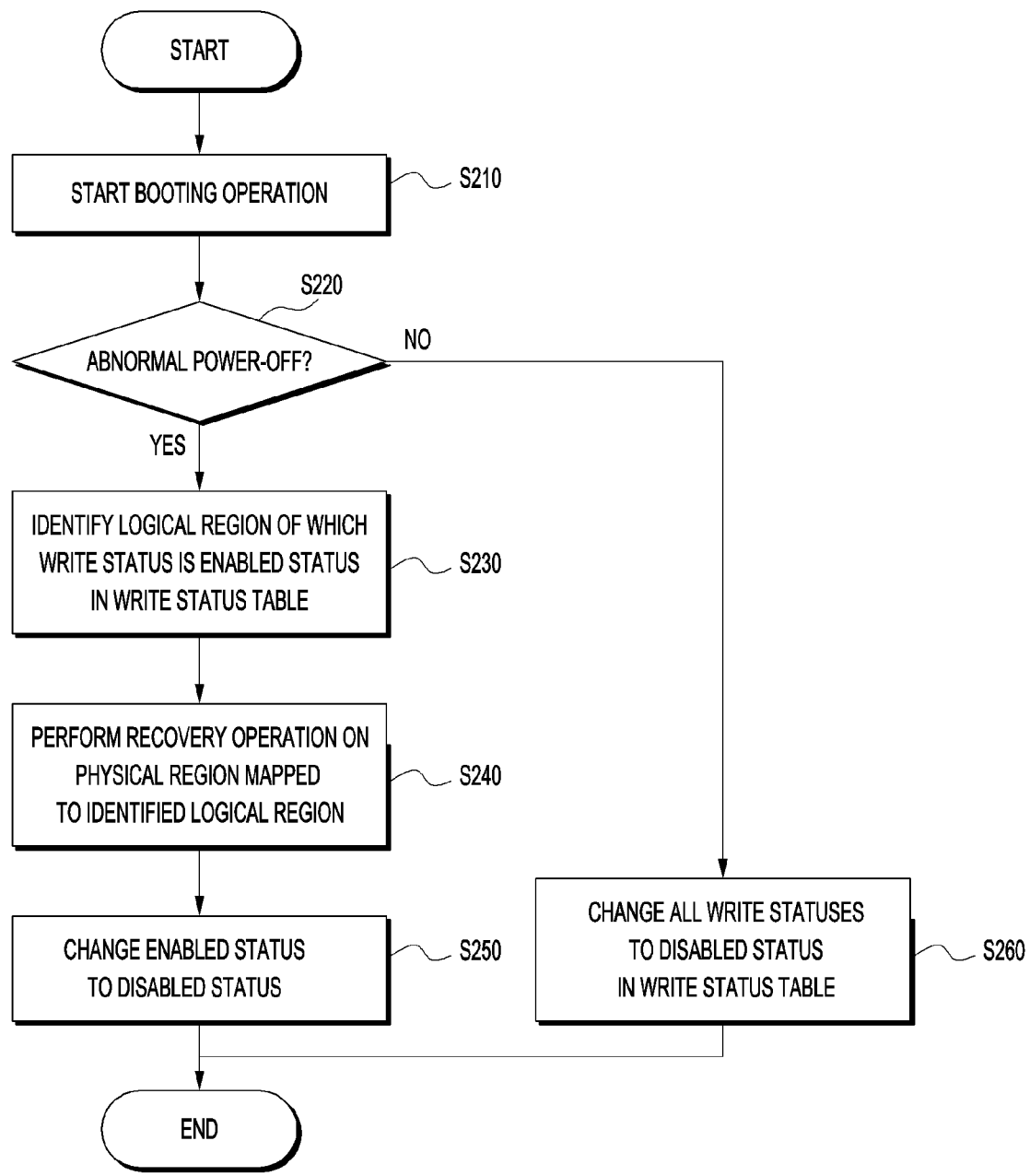
FIG. 6 is a flowchart illustrating an operation of a recovery unit of FIG. 1 according to an embodiment of the present disclosure.

FIG. 6 is a flowchart illustrating an operation of the recovery unit 212 of FIG. 1 according to an embodiment of the present disclosure.

Referring to FIG. 6, in operation S210, the controller 210 may start a booting operation.

In operation S220, the recovery unit 212 may determine whether there is an abnormal power-off of the memory system 200 right before the booting operation. When it is determined that there is not an abnormal power-off of the memory system 200 right before the booting operation, the process may proceed to operation S260. When it is determined that there is an abnormal power-off of the memory system 200 right before the booting operation, the process may proceed to operation S230.

In operation S230, the recovery unit 212 may identify a logical region, corresponding to which the write status is the enabled status within the write status table 135 stored in the host memory buffer 130.

In operation S240, the recovery unit 212 may perform a recovery operation on a physical region mapped to the identified logical region. The recovery unit 212 may not perform the recovery operation on a physical region mapped to a logical region corresponding to which the write status is the disabled status within the write status table 135. Therefore, the time required to perform the recovery operation may be dramatically reduced.

In operation S250, the recovery unit 212 may change the write status corresponding to the identified logical region from the enabled status to the disabled status.

In operation S260, the recovery unit 212 may change all the write statuses to the disabled status within the write status table 135 stored in the host memory buffer 130.

Figure 7:
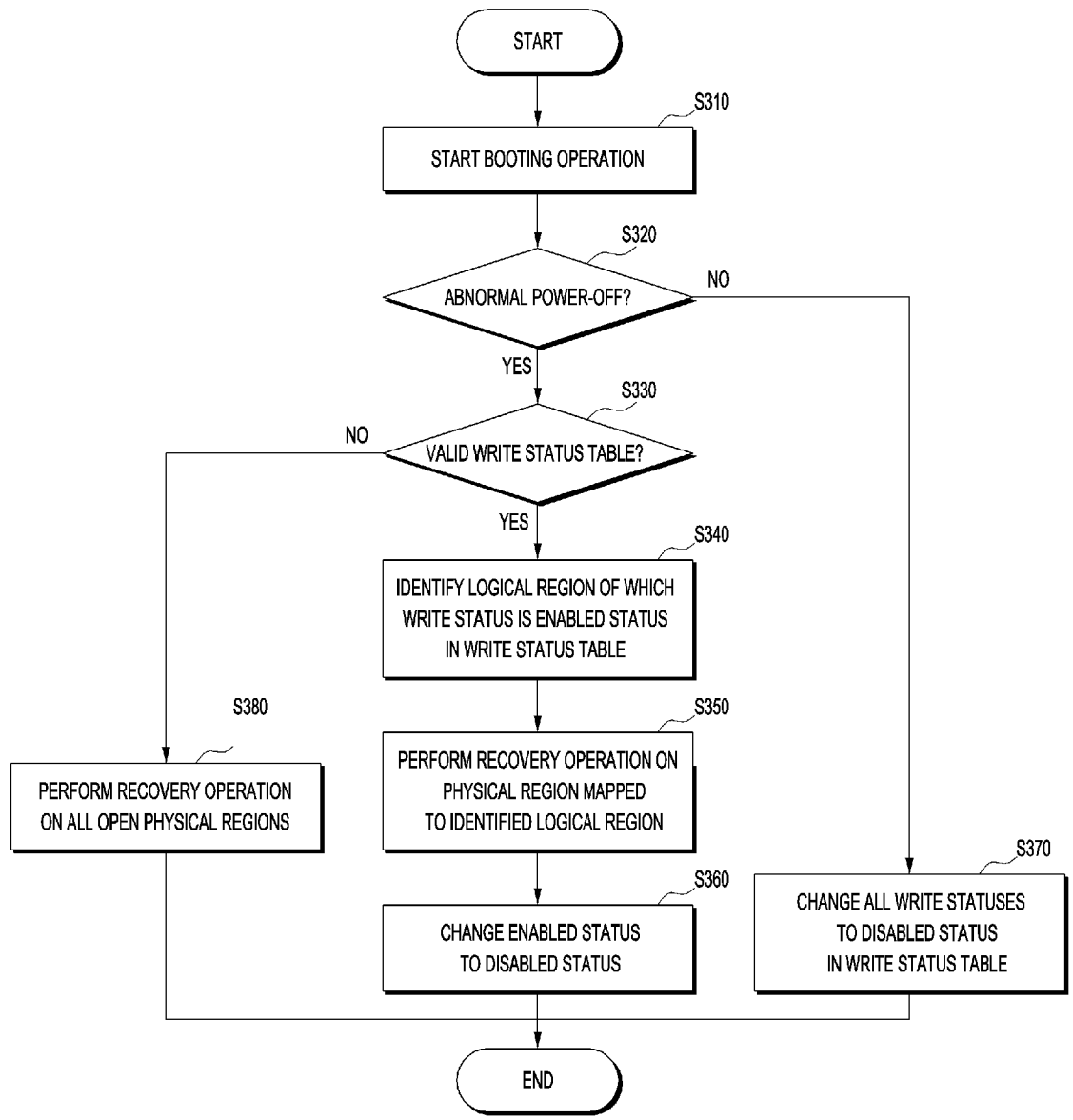
FIG. 7 is a flowchart illustrating an operation of a recovery unit of FIG. 1 according to an embodiment of the present disclosure.

FIG. 7 is a flowchart illustrating an operation of the recovery unit 212 of FIG. 1 according to an embodiment of the present disclosure.

Referring to FIG. 7, in operation S310, the controller 210 may start a booting operation.

In operation S320, the recovery unit 212 may determine whether there is an abnormal power-off of the memory system 200 right before the booting operation. When it is determined that there is not an abnormal power-off of the memory system 200 right before the booting operation, the process may proceed to operation S370. When it is determined that there is an abnormal power-off of the memory system 200 right before the booting operation, the process may proceed to operation S330.

In operation S330, the recovery unit 212 may determine, based on information of validity verification stored in the host memory buffer 130, whether the write status table 135 is valid. When the write status table 135 is determined as valid, the process may proceed to operation S340. When the write status table 135 is determined as invalid, the process may proceed to operation S380.

In operation S340, the recovery unit 212 may identify a logical region corresponding to which the write status is the enabled status within the write status table 135 stored in the host memory buffer 130.

In operation S350, the recovery unit 212 may perform a recovery operation on a physical region mapped to the identified logical region. The recovery unit 212 may not perform the recovery operation on a physical region mapped to a logical region corresponding to which the write status is the disabled status within the write status table 135. Therefore, the time required to perform the recovery operation may be dramatically reduced.

In operation S360, the recovery unit 212 may change the write status corresponding to the identified logical region from the enabled status to the disabled status.

In operation S370, the recovery unit 212 may change all the write statuses to the disabled status within the write status table 135 stored in the host memory buffer 130.

In operation S380, the recovery unit 212 may perform a recovery operation on all of one or more open physical regions.

Figure 8:
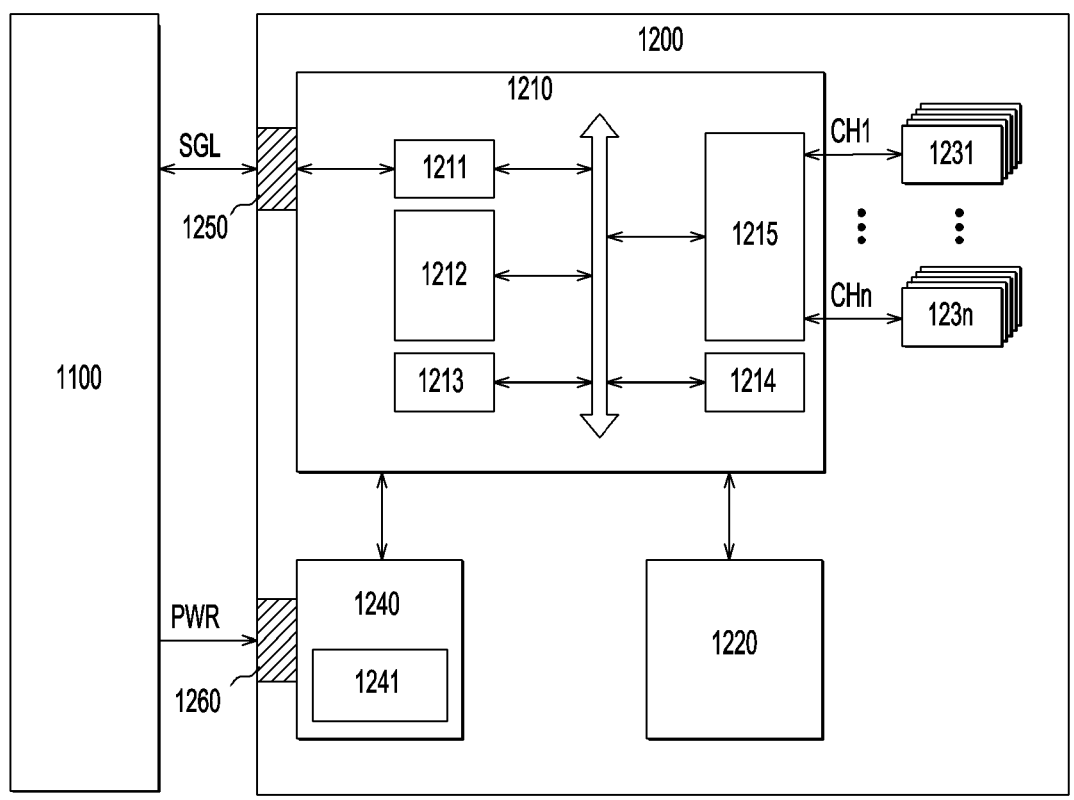
FIG. 8 is a diagram illustrating a data processing system including a solid state drive (SSD) in accordance with an embodiment of the present disclosure.

FIG. 8 is a diagram illustrating a data processing system 1000 including a solid state drive (SSD) 1200 in accordance with an embodiment of the present disclosure. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard communication interfaces or protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software. The control unit 1212 may include the write unit 211 and the recovery unit 212 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
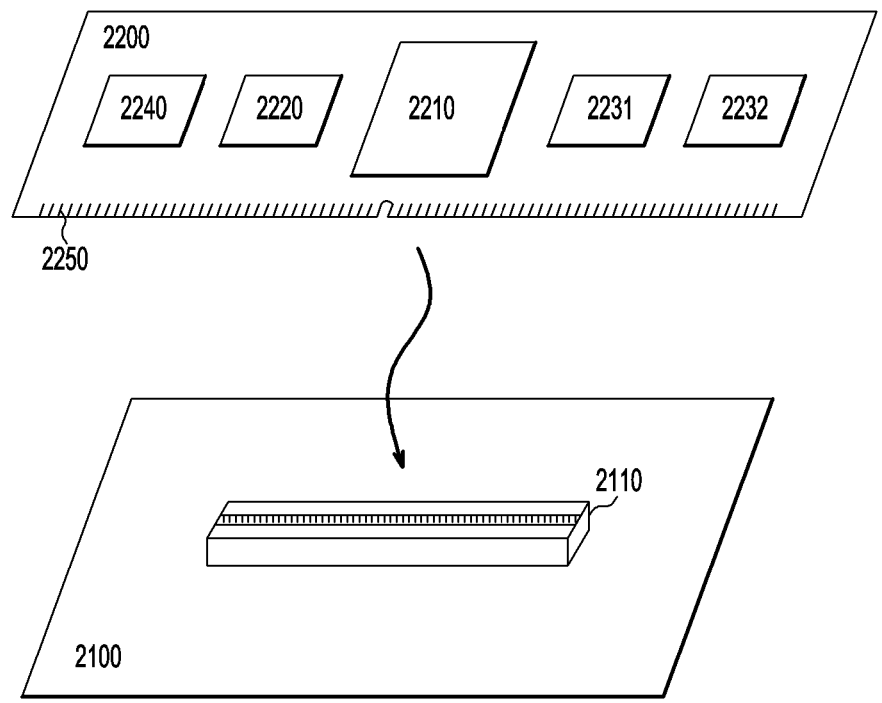
FIG. 9 is a diagram illustrating a data processing system including a memory system in accordance with an embodiment of the present disclosure.

FIG. 9 is a diagram illustrating a data processing system 2000 including a memory system 2200 in accordance with an embodiment of the present disclosure. Referring to FIG. 9, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot, or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200.

The connection terminal 2250 may be disposed on any side of the memory system 2200.

Figure 10:
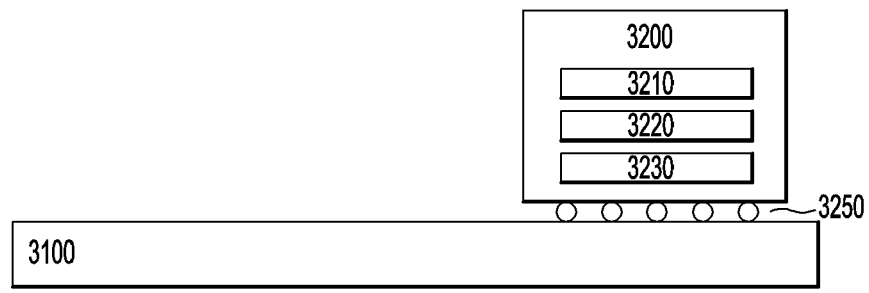
FIG. 10 is a diagram illustrating a data processing system including a memory system in accordance with an embodiment of the present disclosure.

FIG. 10 is a diagram illustrating a data processing system 3000 including a memory system 3200 in accordance with an embodiment of the present disclosure. Referring to FIG. 10, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
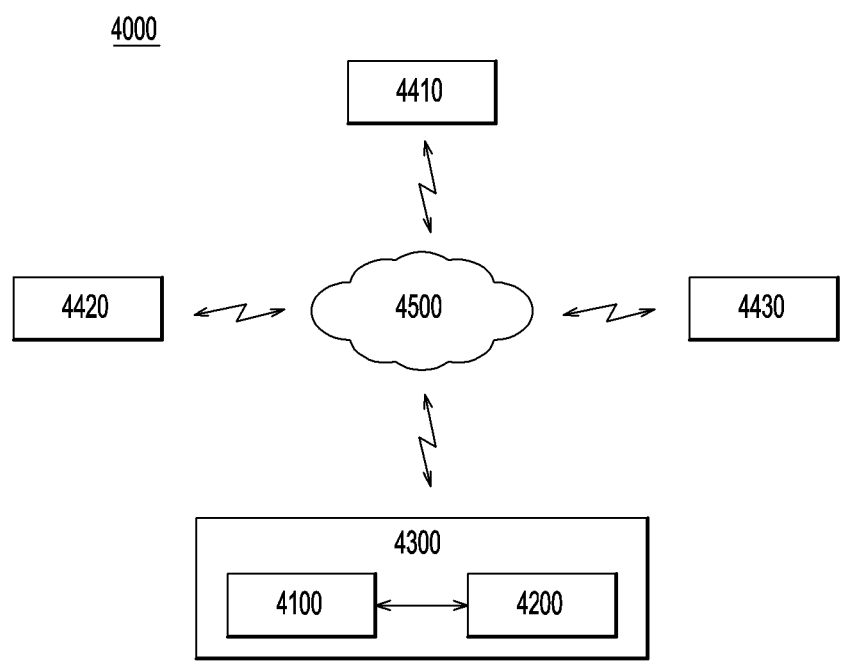
FIG. 11 is a diagram illustrating a network system including a memory system in accordance with an embodiment of the present disclosure.

FIG. 11 is a diagram illustrating a network system 4000 including a memory system 4200 in accordance with an embodiment of the present disclosure. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 200 shown in FIG. 1, the SSD 1200 shown in FIG. 8, the memory system 2200 shown in FIG. 9 or the memory system 3200 shown in FIG. 10.

Figure 12:
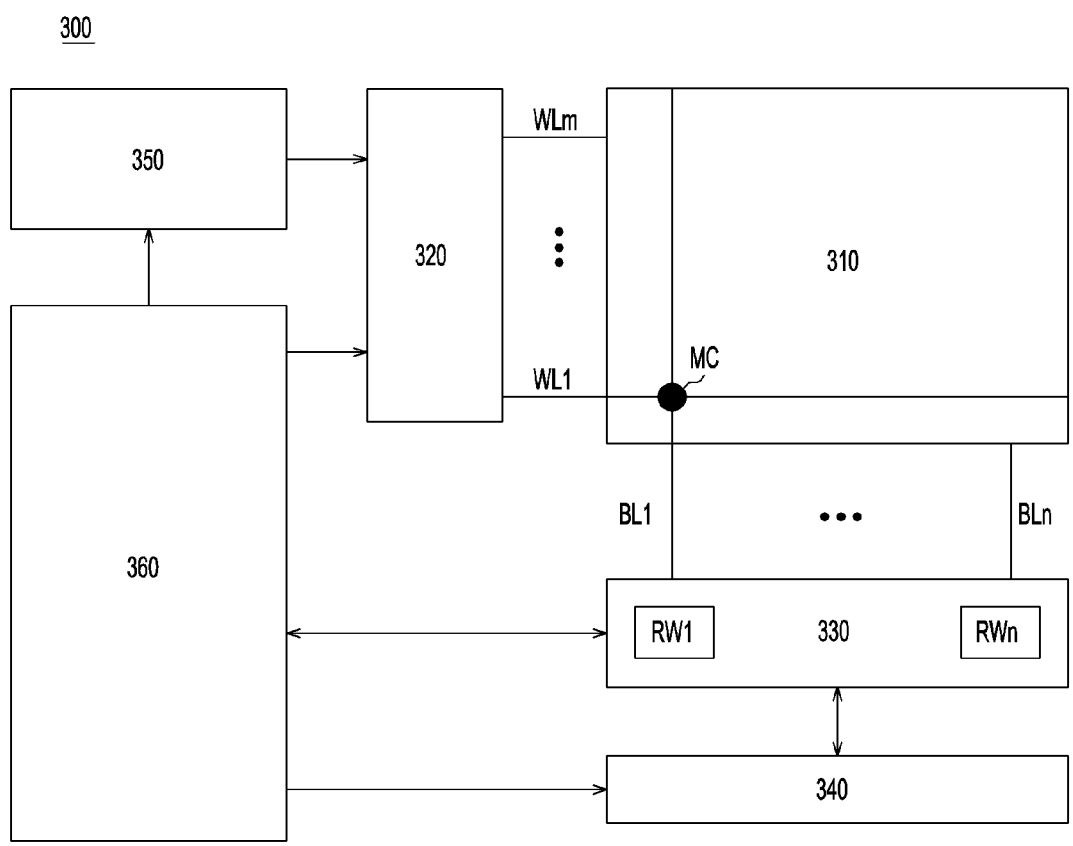
FIG. 12 is a block diagram illustrating a nonvolatile memory device included in a memory system in accordance with an embodiment of the present disclosure.

FIG. 12 is a block diagram illustrating a nonvolatile memory device 300 included in a memory system in accordance with an embodiment of the present disclosure. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While certain embodiments have been described above, it will be understood to those skilled in the art that the embodiments described are by way of example only. Accordingly, the memory system and a controller of the memory system should not be limited based on the described embodiments. Rather, the memory system and a controller of the memory system described herein should only be limited in light of the claims that follow when taken in conjunction with the above description and accompanying drawings.

What is claimed is:

1. A memory system comprising:
a storage medium including a plurality of physical regions; and
a controller configured to map logical regions which are configured by a host device, to the physical regions, and configured to perform in response to a write request for a target logical region, a write operation on a physical region mapped to the target logical region,
wherein the controller is further configured to update in response to the write request, a write status corresponding to the target logical region within a write status table, and
wherein the controller is further configured to update all write statuses in the write status table to a first status directly in response to a determination that during a booting operation there is no abnormal power-off right before the booting operation.

2. The memory system of claim 1, wherein the controller updates the write status by changing the write status from the first status to a second status when the write status is determined to be the first status.

3. The memory system of claim 2, wherein the controller updates the write status by keeping the write status to the second status when the write status is determined to be the second status.

4. The memory system of claim 2, wherein the controller is further configured to identify when it is determined during the booting operation that there is the abnormal power-off right before the booting operation, a logical region having a write status which is the second status within the write status table and further configured to perform a recovery operation on a physical region mapped to the identified logical region.

5. The memory system of claim 4, wherein the controller is further configured to skip the recovery operation on a physical region mapped to a logical region having a write status which is the first status within the write status table.

6. The memory system of claim 4, wherein the controller is further configured to change after the recovery operation, the write status corresponding to the identified logical region from the second status to the first status.

7. The memory system of claim 4, wherein the controller is further configured to verify when it is determined during the booting operation that there is the abnormal power-off right before the booting operation, validity of the write status table based on information of validity verification for the write status table.

8. The memory system of claim 7, wherein the controller is further configured to perform when the write status table is determined as invalid, the recovery operation on all of one or more open physical regions.

9. The memory system of claim 1, wherein the controller is further configured to manage the write status table in a host memory buffer included in the host device.

10. A memory system comprising:
a storage medium including a plurality of physical regions; and
a controller configured to:
receive a write request from a host device external to the memory system,
change a write status corresponding to a target physical region of the write request among the physical regions from a first status to a second status when the write status is the first status within a write status table in response to the write request, and
keep the write status as the second status when the write status is the second status in response to the write request,
wherein the controller is further configured to update all write statuses in the write status table to the first status directly in response to a determination that during a booting operation there is no abnormal power-off right before the booting operation.

11. The memory system of claim 10, wherein the controller is further configured to skip when it is determined during the booting operation that there is the abnormal power-off right before the booting operation, a recovery operation on a physical region having a write status which is the first status within the write status table.

12. The memory system of claim 10, wherein the controller is further configured to change the write status corresponding to the physical region, on which a recovery operation is performed, from the second status to the first status.

13. The memory system of claim 10, wherein the controller is further configured to generate information of validity verification for the write status table whenever updating the write status table.

14. The memory system of claim 13, wherein the controller is further configured to verify when it is determined during the booting operation that there is the abnormal power-off right before the booting operation, validity of the write status table based on the information of validity verification for the write status table.

15. The memory system of claim 10, wherein the controller is further configured to manage the write status table in a host memory buffer included in the host device.

16. The memory system of claim 10, wherein the controller is further configured to perform when it is determined during the booting operation that there is the no abnormal power-off right before the booting operation, a recovery operation on a physical region having a write status which is the second status within the write status table.

17. A controller of a memory system, configured to:
map logical regions which are configured by a host device, to physical regions,
perform in response to a write request for a target logical region, a write operation on a physical region mapped to the target logical region,
skip a recovery operation on a physical region mapped to a logical region having a write status which is a first status and perform the recovery operation on a physical region mapped to a logical region having a write status which is a second status, when it is determined during a booting operation that there is an abnormal power-off, and
update all managed write statuses to the first status directly in response to a determination that during the booting operation there is no abnormal power-off.

18. The controller of claim 17, further configured to change in response to the write request, a write status corresponding to the target logical region from the first status to the second status when the write status corresponding to the target logical region is determined as the first status.

19. The controller of claim 18, further configured to keep in response to the write request, the write status corresponding to the target logical region to the second status when the write status corresponding to the target logical region is determined to be the second status.

20. The controller of claim 17, further configured to change after the recovery operation, the write status from the second status to the first status.

* * * * *